United States Patent
Takashima (10) Patent No.: US 9,395,781 B2
(45) Date of Patent: Jul. 19, 2016

(54) ELECTRONIC DEVICE TO PERFORM ENUMERATION WITHOUT POWER REQUEST TO AN EXTERNAL DEVICE WHEN ELECTRONIC DEVICE IS ON

(71) Applicant: Panasonic Corporation, Osaka (JP)

(72) Inventor: Toru Takashima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 615 days.

(21) Appl. No.: 13/747,560

(22) Filed: Jan. 23, 2013

(65) Prior Publication Data

US 2013/0198535 A1 Aug. 1, 2013

(30) Foreign Application Priority Data

Jan. 27, 2012 (JP) ................................. 2012-015186

(51) Int. Cl.
*G06F 1/26* (2006.01)
(52) U.S. Cl.
CPC ....................................... *G06F 1/266* (2013.01)
(58) Field of Classification Search
CPC ......... G06F 1/263; G06F 1/266; H02J 7/0068
See application file for complete search history.

(56) References Cited

U.S. PATENT DOCUMENTS

| | | | | |
|---|---|---|---|---|
| 6,128,743 | A * | 10/2000 | Rothenbaum ........... | G06F 1/266 710/100 |
| 6,249,825 | B1 * | 6/2001 | Sartore ................... | G06F 13/10 710/10 |
| 6,252,375 | B1 * | 6/2001 | Richter et al. ................ | 320/127 |
| 7,631,111 | B2 * | 12/2009 | Monks et al. ................... | 710/15 |
| 2002/0093583 | A1 * | 7/2002 | Ito ................................ | 348/373 |
| 2004/0139265 | A1 * | 7/2004 | Hocker, III ........... | G06F 13/385 710/305 |
| 2005/0060447 | A1 | 3/2005 | Tanaka | |
| 2006/0152084 | A1 * | 7/2006 | Tupman ................ | H02J 7/0054 307/64 |
| 2008/0126594 | A1 * | 5/2008 | Monks .................... | G06F 1/266 710/17 |
| 2010/0033018 | A1 | 2/2010 | Fukasawa et al. | |
| 2012/0078690 | A1 * | 3/2012 | Harriman et al. ............ | 705/14.4 |
| 2013/0132614 | A1 * | 5/2013 | Bajpai ....................... | G06F 3/00 710/10 |

FOREIGN PATENT DOCUMENTS

| | | |
|---|---|---|
| JP | 2002-218300 | 8/2002 |
| JP | 2005-078304 | 3/2005 |
| JP | 2008-178584 | 8/2008 |
| JP | 2011-176936 | 9/2011 |
| WO | WO2008/044297 | 4/2008 |

* cited by examiner

*Primary Examiner* — Thomas Lee
*Assistant Examiner* — Danny Chan
(74) *Attorney, Agent, or Firm* — Panasonic IP Management; Dhiren Odedra (57) ABSTRACT

An electronic device can communicate with an external device according to a predetermined method. The electronic device includes a power switch operable to receive an operation for switching on and off the electronic device, a detector operable to detect a connection between the electronic device and the external device according to the predetermined method, and a requestor operable to request the external device to supply power. When the detector detects the connection between the electronic device and the external device with the power switch being ON, the requestor does not request the external device to supply the power in an establishing process for establishing the communication with the external device. When the detector detects the connection between the electronic device and the external device and the power switch is switched from ON into OFF, the requestor requests the external device to supply the power in the establishing process.

8 Claims, 7 Drawing Sheets

ELECTRONIC DEVICE TO PERFORM ENUMERATION WITHOUT POWER REQUEST TO AN EXTERNAL DEVICE WHEN ELECTRONIC DEVICE IS ON

BACKGROUND

1. Technical Field

The present disclosure relates to an electronic device capable of connecting with an external device via an USB (Universal Serial Bus) interface.

2. Related Art

USB devices are known as electronic devices having a plurality of functions. The USB devices having plurality of functions store a plurality of USB descriptors (hereinafter, "descriptor") as information indicating the respective functions.

Various approaches to establishing communication between such a USB device and a host device have been proposed. For example, JP2005-78304A describes an USB function device (USB device) as discussed below. In general, upon the USB function device being connected to a host device, the host device requests a descriptor from the USB function device. In response to the request, the USB function device sends a descriptor indicating one function pre-selected by a user out of a plurality of functions to the host device. When the host device does not support the function indicated by the sent descriptor, after a certain time period, the USB function device selects another descriptor. Here, the second descriptor indicates a function different from the function indicated by the previously sent first descriptor. Then, the USB function device starts an USB bus reset for initializing the communication between the USB function device and the host device. When reconnected to the host device after the USB bus reset, the USB function device sends the selected second descriptor to the host device in response to the request from the host device for a descriptor. T Accordingly, the USB function device described in JP2005-78304A has an improvement in the capability of establishing connection with the host device.

SUMMARY

However, a problem associated with the conventional USB function device disclosed in JP2005-78304A is a long time requirement to execute a process for establishing communication with a host device (enumeration). Causes of this long time requirement are discussed below.

Even when the USB function device sends a descriptor to the host device, the communication between the host device and the USB function device does not start unless the host device supports the function indicated by the descriptor. In order to avoid a situation in which no communication begins entirely, the USB function device sets a timer in the USB function device when sending the descriptor to the host device. When the USB function device does not receive a response from the host device within a predetermined time period after sending the descriptor (i.e., in case of time out), the USB function device determines that the host device does not support the function indicated by the sent descriptor. Then, the USB function device switches the function currently set in the USB function device to another function, and then starts an USB bus reset. Next, after the reconnection, the USB function device sends the descriptor corresponding to the new function to the host device. Such operations prevent the USB function device from starting the reconnection with the switched function until the timer times out when the USB function device sent a descriptor indicating a function which is not supported by the host device. Accordingly, enumeration between the USB function device and the host device can requires a long time.

Further, when the USB device tries to establish the communication with the host device without switching the descriptor to reconnect, as mentioned above, a state in which communication between the host device and the USB function device is not started indefinitely might occur depending on contents of a descriptor transmitted from the USB device.

Particularly when the USB device is connected to the host device during the operation of the USB device (or at a time of activation), and the USB device takes a long time to establish the communication or the communication is not started indefinitely due to the above reason, convenience of the USB device is not satisfactory.

USB devices that can be charged with power supplied from a host device are known. Such USB devices request intended amount of power from the host device by transmitting descriptors including information indicating an amount of power to the host device.

When determining that the host device can supply the requested power to the USB devices, the host device supplies the powers to the USB devices. On the other hand, when determining that the host device cannot supply the requested power to the USB devices, the host device does not establish communication with the USB devices. Therefore, in order to avoid the situation that the communication is not established indefinitely, as mentioned above, the USB devices detect timeout and can reconnect with another descriptor.

Therefore, also when requesting the host device to supply power, the USB devices might require a long time until the USB devices can be used.

As seen above, also when the USB devices that can request the host device to supply the power are connected to the host device, the convenience of the USB devices is not satisfactory.

The present disclosure provides an electronic device that can request a host device to supply power and can improve convenience when connecting to the host device in comparison with the conventional approach.

The electronic device according to the present disclosure can communicate with an external device according to a predetermined method. The electronic device includes a power switch operable to receive an operation for switching on and off the electronic device, the power switch being turned off when receiving the operation for switching off and turned on when receiving the operation for switching on, a detector operable to detect a connection between the electronic device and the external device according to the predetermined method, and a requestor operable to request the external device to supply power. When the detector detects the connection between the electronic device and the external device with the power switch being ON, the requestor does not request the external device to supply the power in an establishing process for establishing the communication with the external device. When the detector detects the connection between the electronic device and the external device and the power switch is switched from ON into OFF, the requestor requests the external device to supply the power in the establishing process.

Another electronic device according to the present disclosure can communicate with an external device according to a predetermined method. The electronic device includes a controller and a memory storing instructions for configuring the controller. The controller is configured to detect a connection between the electronic device and the external device, and to send a request to the external device to supply power during an establishing process for establishing the communication with the external device only when power to the electronic device is in an off state.

Since the electronic device composed as above does not request power supply from the external device when the power switch is ON, the communication with the external device is more likely to be established at a higher speed than a case where a power supply request is sent to the external device when the power switch is ON. Also, when the power switch is switched from ON to OFF, the electronic device requests the external device to supply power. Here, when the power switch is OFF, namely, when the electronic device is not operated, the electronic device is not expected to establish the communication at a high speed. Therefore, the electronic device can request the external device to supply the power without deteriorating the convenience.

Therefore, the electronic device can satisfy both the establishment of the communication at a higher speed at the operation time and the request for power supply. As a result, the electronic device that can request the power supply can improve the convenience when connected to the external device more than the conventional approach.

DETAILED DESCRIPTION OF PREFERRED EMBODIMENTS

An exemplary embodiment will be described below with reference to the attached drawings. A personal computer will be exemplified below as a host device, and a digital camera connectable to the personal computer via an USB interface will be exemplified as an electronic device.

In the description of the present disclosure, certain unnecessary portions regarding, for example, conventional technology and redundant descriptions of substantially the same configuration may be omitted for ease of description.

The following description and the attached drawings are disclosed to enable those skilled in the art to sufficiently understand the present disclosure, and are not intended to limit the subject matter of the claims.

1. Configuration of Digital Camera

A digital camera according to the present embodiment will be described.

1-1. Configuration on Exterior of Digital Camera>

Figure 1:
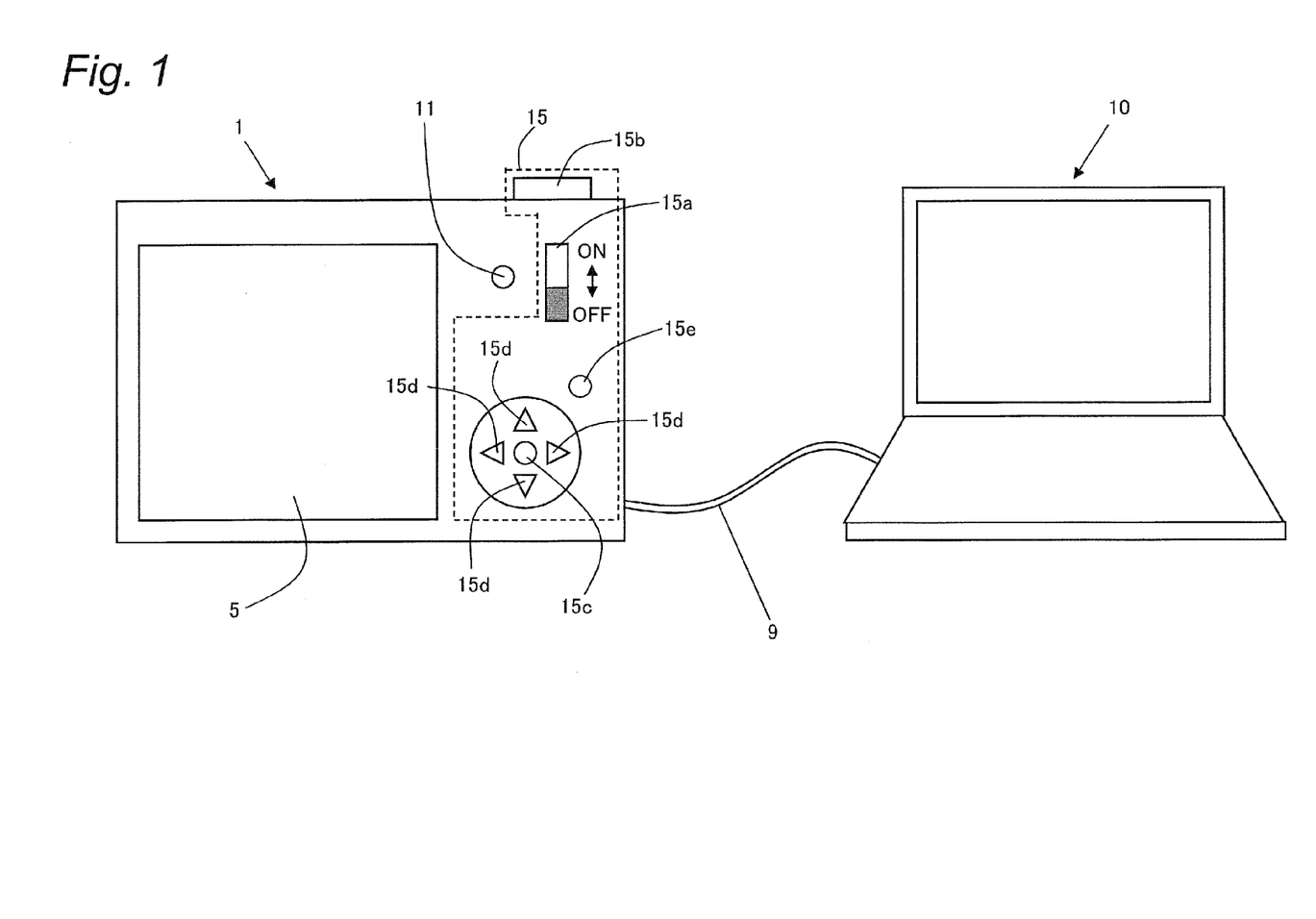
FIG. 1 is a diagram for describing a partial configuration of a digital camera and connection between a digital camera and a personal computer according to an exemplary embodiment.

FIG. 1 is a diagram illustrating a digital camera according to the present embodiment and a personal computer connected to the digital camera. The digital camera 1 can be connected to the personal computer (hereinafter, "PC") 10 as an external device via an USB cable 9. In this USB connection, the PC 10 is a host (USB host device), and the digital camera 1 is a function (a peripheral, USB device).

The digital camera 1 includes a liquid crystal monitor 5, an LED 11, and an operation unit 15. The operation unit 15 includes a power switch 15a, a shutter button 15b, a decision button 15c, a cursor key 15d, and a menu button 15e.

The liquid crystal monitor 5 is a display means for displaying a captured image or a through image. The operation unit 15 receives user's operations. The power switch 15a is a switch for switching ON/OFF the power of the digital camera 1 and slidable in the directions of the double arrow in the present drawing. When the power switch 15a is slid to the ON side of the double arrow, the power is switched ON. When the power switch 15a is slid to the OFF side of the double arrow, the power is switched OFF. The shutter button 15b is a button for operating the shutter of the digital camera 1. When the shutter button 15b is pressed down, the shutter operates. The cursor key 15d is a key for moving a cursor in the image displayed on the liquid crystal monitor 5. The decision button 15c is a button for performing operations including confirmation of an item selected with the cursor. The menu button 15e is a button for displaying a setting menu or the like in the image displayed on the liquid crystal monitor 5.

Note that the digital camera 1 may have, for example, an organic EL display panel in place of the liquid crystal monitor 5. Further, instead of these displaying members, the digital camera 1 may have arbitrary device that can display images.

The LED 11 lights to indicate to the user that the battery is being charged. For example, the LED 11 lights while the battery of the digital camera 1 is being charged with a voltage of 5V supplied from the PC 10 when the PC 10 and the digital camera 1 are connected via the USB cable 9.

1-2. Configuration Inside Digital Camera

A Configuration of the digital camera 1 will be described.

Figure 2:
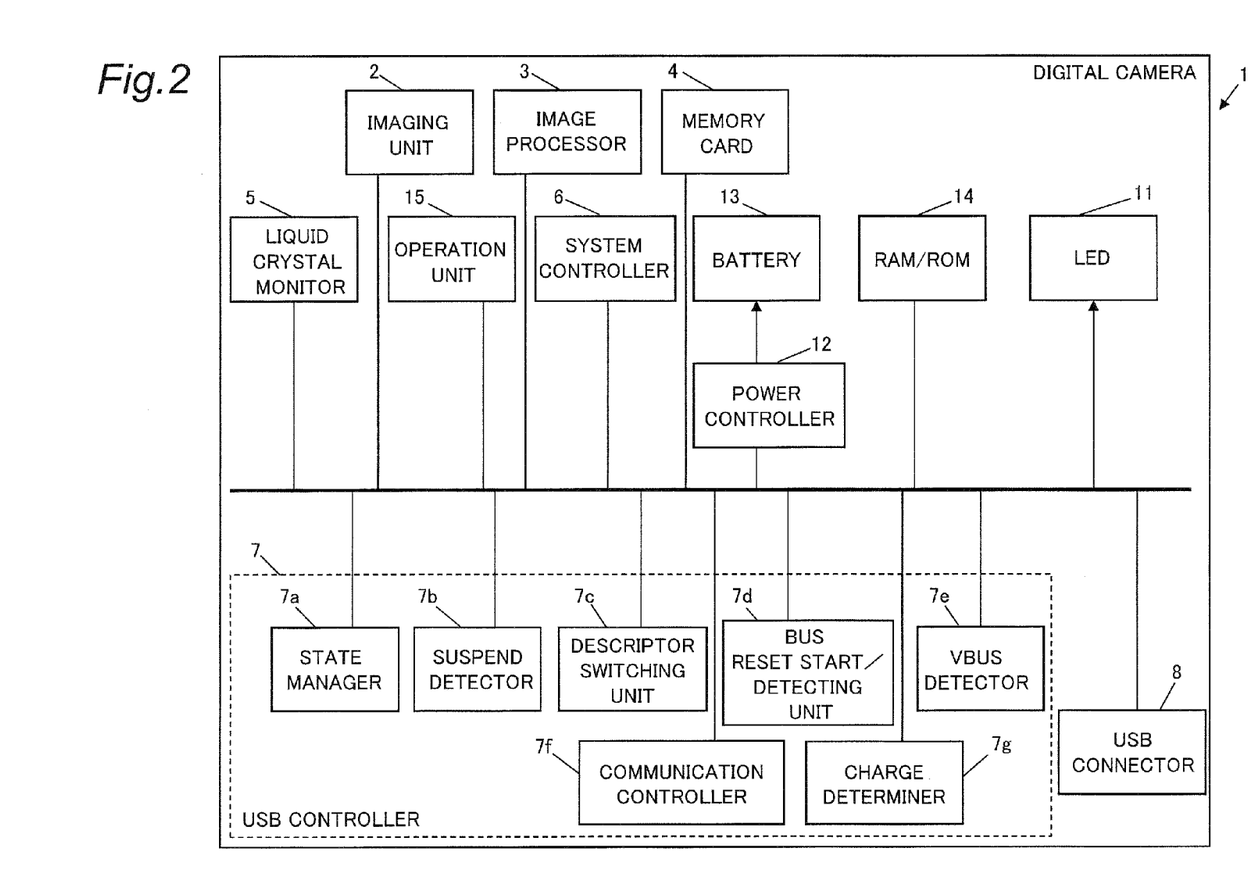
FIG. 2 is a block diagram illustrating an electrical configuration of the digital camera according to the exemplary embodiment.

FIG. 2 is a block diagram illustrating an electric configuration of the digital camera 1. The digital camera 1 has the imaging unit 2, an image processor 3, a memory card 4, a system controller 6, a USB controller 7, a USB connector 8, a power controller 12, the battery 13, and a RAM/ROM 14.

The imaging unit 2 converts optical signals from the subject into electric signals to generate image data. The imaging unit 2 includes lenses, a CCD, and the like.

The image processor 3 performs predetermined processing on the image data generated by the imaging unit 2. For example, the image processor 3 performs enlarge processing, reduction processing, compression processing (JPEG compression and the like), and/or expand processing on the image data. The image processor 3 outputs the processed image data to the liquid crystal monitor 5, the memory card 4, and/or the system controller 6.

The memory card 4 stores the image data output from the image processor 3. Also, the memory card 4 outputs the stored image data to the image processor 3. The memory card 4 includes a semiconductor memory (flash memory, ferro-electric memory, and so on) or the like.

The system controller 6 is a control unit for controlling the respective units of the digital camera 1 and includes a CPU or the like. The system controller 6 controls the imaging unit 2, the image processor 3, and the USB controller 7 based on operations received by the operation unit 15.

The USB connector 8 is a connector for connecting the USB cable 9.

The USB controller 7 is a means for controlling communication compliant with a USB standard. The USB controller 7 includes a state manager 7a, a suspend detector 7b, a descriptor switching unit 7c, a bus reset start/detecting unit 7d, a VBUS detector 7e, a communication controller 7f, and a charging determiner 7g.

The state manager 7a manages the state of the digital camera 1 in USB connection. The suspend detector 7b detects suspension (suspend state) of the PC 10. The descriptor switching unit 7c decides a descriptor (device descriptor or configuration descriptor) (described later) to be sent by the digital camera 1 to the PC 10 when the digital camera 1 receives a descriptor request issued by the PC 10. The bus reset start/detecting unit 7d performs a control for resetting (bus reset) the communication via an USB cable 9 between the digital camera 1 and the PC 10 on the digital camera 1 side. When the digital camera 1 is connected to the PC 10 via the USB cable 9, the VBUS detector 7e detects a voltage of 5V (hereinafter, referred to as "VBUS") supplied from the PC 10 through a VBUS signal wire of the USB cable 9. By detecting the VBUS, the VBUS detector 7e detects the connection via the USB connector 8 between the digital camera 1 and the PC 10. The communication controller 7f controls the communication between the PC 10 and the digital camera 1. The charging determiner 7g determines whether battery 13 can be charged with power supplied from the PC 10.

The power controller 12 detects the power supply voltage of the battery 13 and/or the AC power and controls the battery 13 and/or the AC power to supply power needed to the operation of the digital camera 1 to the respective units of the digital camera 1.

When the PC 10 and the digital camera 1 are connected to each other via the USB cable 9, the power controller 12 also controls charging of the battery 13 by the 5V power supply of the PC 10.

The RAM/ROM 14 includes a volatile RAM and a non-volatile ROM which is dedicated to reading. The RAM temporarily stores the image data and the other data to be treated in the digital camera 1. The ROM stores predetermined unchangeable information, programs, and the like to be executed by the system controller 6. The ROM also stores device descriptors and configuration descriptors to be used by the USB controller 7 in the USB connection.

The device descriptors and the configuration descriptors according to the present embodiment are information in the form compliant with the USB standard.

The RAM/ROM 14 of the digital camera 1 according to the present embodiment stores two device descriptors and two configuration descriptors. Each of the device descriptors includes information about a device ID of the digital camera 1 and a number of communication settings (configuration) which the digital camera 1 supports. Each of the configuration descriptors includes at least information indicating presence/absence of the request for power to the PC 10, and communication class supported by the digital camera 1 (for example, mass storage class, audio class, and so on). Further, when including the information indicating the request for the power supply to the host device, the configuration descriptor further includes information indicating power capacity to be requested.

The two configuration descriptors stored in the RAM/ROM 14 of the digital camera 1 will be described. Hereinafter, the two configuration descriptors will be referred to as "configuration descriptor A" and "configuration descriptor B". The configuration descriptor A includes information indicating that the digital camera 1 requests power supply from the host device (PC 10 in the present exemplary embodiment) to operate on the bus power. Hereinafter, the information indicating that power supply is requested from the host device will be referred to as "information requesting power".

The configuration descriptor B includes information indicating that the digital camera 1 does not request power supply from the PC 10 to cause the digital camera 1 to operates on the self-power. Hereinafter, the information indicating that power supply is not requested from the PC 10 will be referred to as "information requesting no power".

Further, The configuration descriptor A also includes information indicating the value of power (e.g., 500 mA) to be requested from the PC 10 and information indicating that the communication class is the mass storage class. The configuration descriptor B also includes information indicating that the communication class supported by the digital camera 1 is the mass storage class.

Note that the digital camera 1 is one example of the electronic device described in Summary. The power switch 15a is one example of the power switch. The VBUS detector 7e is one example of the detector. The USB controller 7 is one example of the requestor.

2. Operation of Digital Camera

The operation performed by the digital camera 1 with the above described configuration to establish communication with the PC 10 upon connecting to the PC 10 will be described. First, a usual operation to establish communication in an USB connection will be described, and then, the operation performed by the digital camera 1 according to the present exemplary embodiment to establish communication with the PC 10 will be described.

2-1. Operation for Establishing USB Connection

The operation for establishing the communication in the general USB connection will be described.

Figure 3:
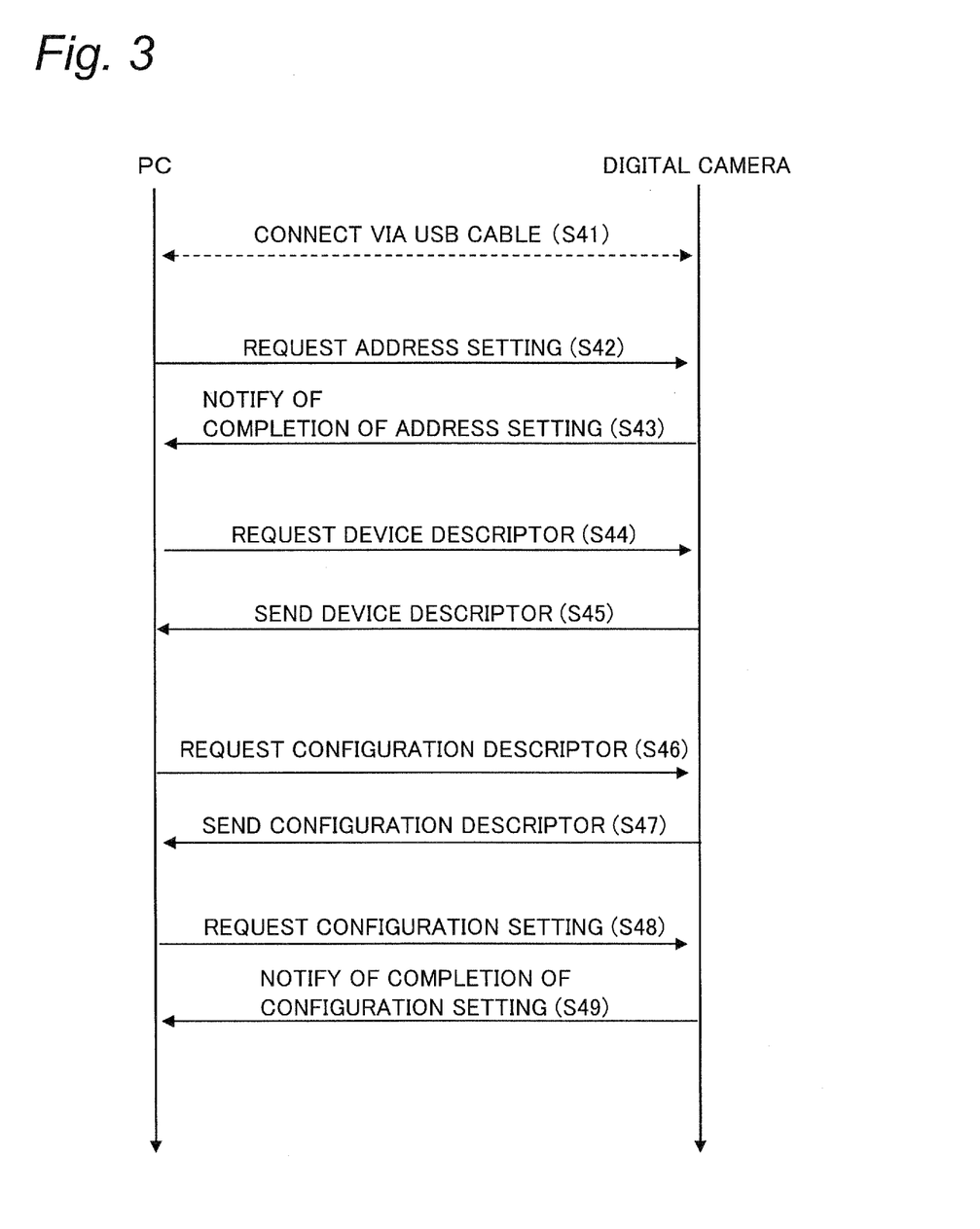
FIG. 3 is a sequence chart for describing a general operation until establishment of communication between the digital camera and the personal computer via an USB interface.

FIG. 3 is a chart showing a sequence for describing a usual operation for establishing communication between the digital camera 1 and the PC 10 via an USB interface. A series of operations or process for establishing communication between the digital camera 1 and the PC 10 via the USB interface is called "enumeration".

Note that the PC 10 outputs a signal indicating suspension (hereinafter, referred to as "suspend signal") to the digital camera 1 as required by the circumstance. The suspend signal is continuously output while the PC 10 is indicating suspension to the digital camera 1. Specifically, the PC 10 keeps outputting the suspend signal, for a predetermined time immediately after the PC 10 is connected with the USB device (the digital camera 1 in the present exemplary embodiment), when the PC 10 determines that the PC 10 does not support the USB device function indicated by the configuration descriptor sent from the USB device, or when the PC 10 is in the power save mode or the like.

The suspend signal which is output immediately after the USB device is connected to the PC 10 is stopped when a predetermined time elapses. Hereinafter, a state of PC 10 indicated by the suspend signal output immediately after the connection with the USB device will be referred to as "initial suspend state". Further, the suspend signal, which is output when the PC 10 determines that PC 10 does not support the USB device function indicated by the configuration descriptor sent from the USB device, continues to be output until the communication between the USB device and the PC 10 is initialized (bus reset). Further, the suspend signal which is output when the PC 10 enters the power save mode or the like is stopped when the PC 10 exits the power save mode or the like.

The digital camera 1 has a function for determining in which of these occasions the suspend signal is output. The determining function will be described in detail later.

Further, since the USB connection is a system in which the host device operates as a master device, the communication goes on in the manner that the digital camera 1 responds to a request issued by the PC 10 when the digital camera 1 receives the request.

When the digital camera 1 is connected to the PC 10 via the USB cable 9, the PC 10 serving as the host device sends the suspend signal indicating the initial suspend state to the digital camera 1. The initial suspend state is disabled after a predetermined time. After the initial suspend state is disabled, the digital camera 1 and the PC 10 start the request processing and the response processing (enumeration) to establish communication between the digital camera 1 and the PC 10.

That is, as shown in FIG. 3, when the digital camera 1 is connected to the PC 10 via the USB cable (S41) and subsequently the initial suspend state is disabled, the PC 10 decides the address to specify to the digital camera 1 and sends the address together with a request for the address setting to communicate with the digital camera 1 (S42).

When receiving the request for the address setting, the digital camera 1 stores the specified address and notifies the PC 10 of the completion of the address setting (S43). Setting the address specified by the PC 10 to the digital camera 1 enables the PC 10 to identify the digital camera 1 connected to the PC 10 and to control it. Thereby, the digital camera 1 is enabled to respond only to the request corresponding to the address specified by the PC 10.

After the address setting (S42, S43), the PC 10 requests the device descriptor from the digital camera 1 to obtain the device ID, the number of supported communication configurations and the like of the connected digital camera 1 (S44). After receiving the request for the device descriptor, the digital camera 1 sends to the PC 10 the device descriptor preset by the USB controller 7 of the digital camera 1 (S45).

Based on the obtained device descriptor, the PC 10 requests from the digital camera 1 the configuration descriptor to obtain information about the presence or absence of the power request, the communication class, and the like of the digital camera 1 (S46).

After receiving the request for the configuration descriptor, the USB controller 7 of the digital camera 1 sends to the PC 10 the configuration descriptor preset by the descriptor switching unit 7c (S47).

Based on the obtained configuration descriptor, the PC 10 determines whether the PC 10 supports the power setting requested by the digital camera 1 (the presence or absence of request to the PC 10 for supplying power and/or the power capacity) and the communication class supported by the digital camera 1. When determining that PC 10 supports the power setting and the communication class requested by the digital camera 1, the PC 10 requests the digital camera 1 to perform the configuration setting (S48). Herein, the configuration setting request includes information for specifying the configuration to be set by the digital camera 1.

When receiving the request for the configuration setting, the USB controller 7 of the digital camera 1 performs the configuration setting to enable the digital camera 1 to communicate with the PC 10 on the communication class indicated by the configuration descriptor sent to the PC 10 (for example, the mass storage). Then, the USB controller 7 of the digital camera 1 notifies the PC 10 of the completion of the configuration setting (S49).

Henceforth, the digital camera 1 and the PC 10 can communicate with each other on the communication class set in the configuration setting.

With the above described operation, the enumeration between the digital camera 1 and the PC 10 is completed.

On the other hand, when determining that the PC 10 does not support the power setting and the communication class requested by the digital camera 1, the PC 10 does not send a request for the configuration setting to the digital camera 1. In that case, a problem in which communication between the PC 10 and the digital camera 1 never starts, as described above, occurs.

The conventional art addresses the problem by detecting the time-out. Nevertheless, this approach leaves a problem of taking much time during the communication establishment.

However, the digital camera 1 according to the present exemplary embodiment solves this problem. The digital camera 1 according to the embodiment also executes general enumeration shown in FIG. 3 similarly (S41 to S49). However, the digital camera 1 sets a device descriptor and a configuration descriptor to be transmitted to the PC 10 in this enumeration according to the state of the power switch 15a. As a result, the digital camera 1 can improve the convenience when connected to the PC 10 further than the conventional approach. Specifically, when the digital camera 1 is connected to the PC 10 via the USB cable 9 and the power switch 15a of the digital camera 1 is on the ON side, the digital camera 1 sets a configuration descriptor to be transmitted to the PC 10 to the configuration descriptor B (including information requesting no power). Further, when the digital camera 1 is connected to the PC 10 via the USB cable 9 and the power switch 15a is switched from the ON side into the OFF side, the digital camera 1 sets a configuration descriptor to be transmitted to the PC 10 to the configuration descriptor A (including information requesting power). Further, the device descriptor is set according to the set configuration descriptor.

By setting a device descriptor and configuration descriptor in such a manner, the digital camera 1 does not request the PC 10 to supply the power when the power switch 15a is on the ON side. Thereby, the likelihood of establishing the communication at a high speed is improved further than the case in which the power supply is requested. Further, since the digital camera 1 requests the power supply from the PC 10 during non-operation of the digital camera 1, even if the establishment of the communication takes a long time, the user's convenience is not deteriorated.

Therefore, the digital camera 1 according to the present embodiment can satisfy both the higher-speed communication establishment during the operation and the request for the power supply to the PC 10. As a result, convenience while the digital camera 1 that can request power supply is connected to the PC 10 is improved further than the conventional approach.

Details of such an operation of the digital camera 1 according to the present embodiment will be described below.

2-2. State Transition Inside Digital Camera

State transition of the digital camera 1 according to the present embodiment during the enumeration will be described. The state manager 7a of the digital camera 1 manages the state concerning the USB connection (hereinafter, referred to as "USB connection state") inside the digital camera 1 during the enumeration. For example, when the address setting of the digital camera 1 is completed, the state manager 7a sets the USB connection state to "address setting completed state" indicating that the address has been set. The USB connection state management can be implemented, for example, by using information indicating the USB connection state or by using a device for detecting the USB connection state.

Hereinafter, the device descriptor and the configuration descriptor are generically called "descriptors".

Figure 4:
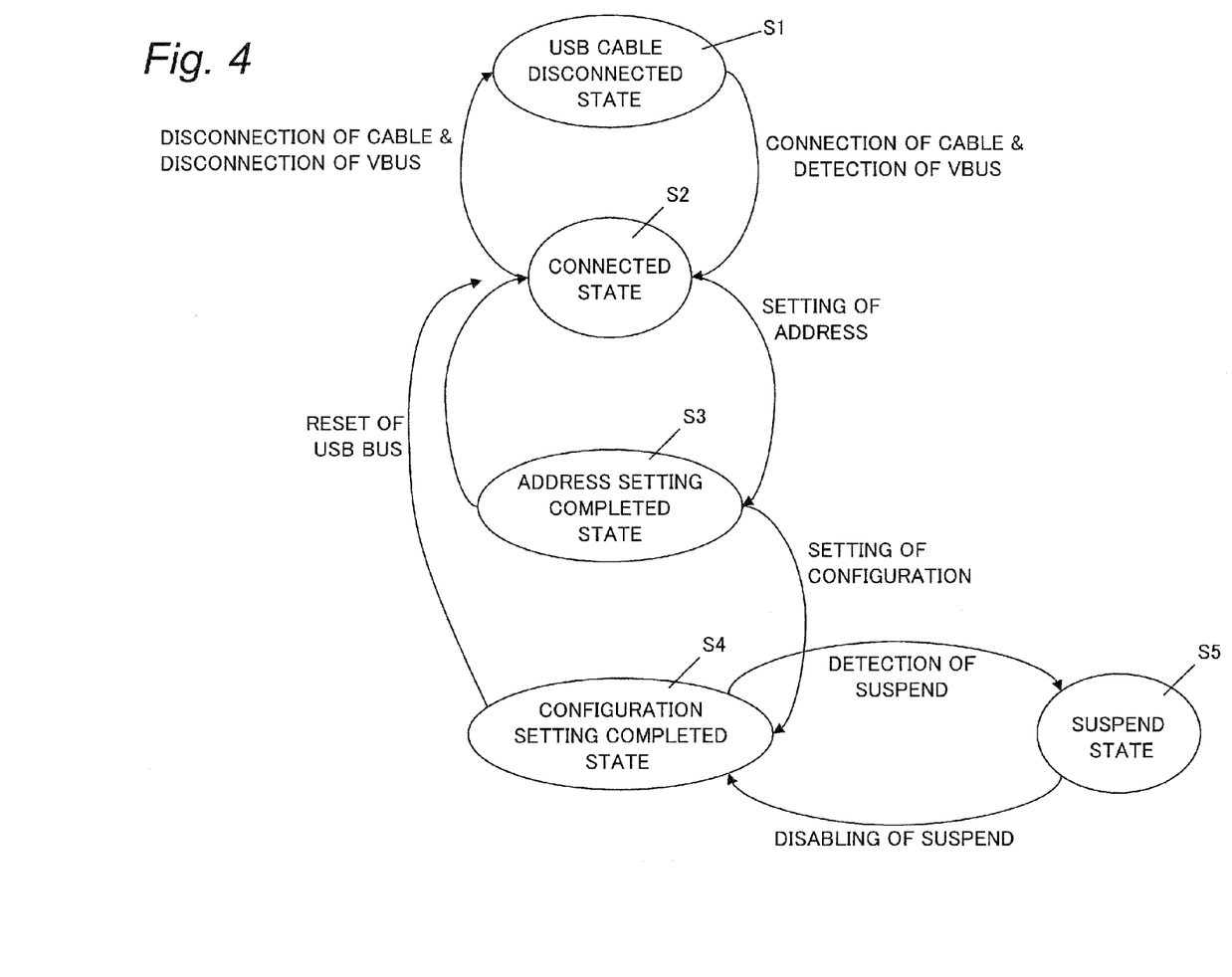
FIG. 4 is a state transition diagram for describing a state transition of the digital camera relating to enumeration according to the exemplary embodiment.

FIG. 4 is a diagram for describing transition of the USB connection state of the digital camera 1 according to the present exemplary embodiment during enumeration.

When the power switch 15a is slid to the ON side, the state manager 7a sets the USB connection state to "USB cable disconnected state" (S1) indicating that the digital camera 1 is not connected to the PC 10 via the USB cable 9.

When the VBUS detector 7e detects connection between the digital camera 1 and the PC 10 while the USB connection state is the "USB cable disconnected state" (S1), the state manager 7a sets the USB connection state to "connected state" (S2).

When the initial suspend state is disabled and subsequently the address setting of the digital camera 1 is completed while the USB connection state is the "connected state" (S2) (steps S42 and S43 in FIG. 3), the state manager 7a sets the USB connection state to "address setting completed state" (S3).

When the request for/sending of the descriptor and the configuration setting of the digital camera 1 are completed (steps S43 to S49 in FIG. 3) while the USB connection state is the "address setting completed state" (S3), the state manager 7a sets the USB connection state to "configuration setting completed state" (S4).

Here, when the PC 10 does not support the power setting and the communication class indicating by the descriptor transmitted from the digital camera 1, as described above, the PC 10 does not request the configuration setting from the digital camera 1. In this case, the PC 10 outputs the suspend signal to the digital camera 1. For example, a case where the descriptor to be transmitted to the PC 10 includes information requesting the power supply and the PC 10 is requested to supply power of 500 mA will be considered. In this case, the determination whether the PC 10 can supply the digital camera 1 the power amount requested by the digital camera 1 differs according to a type of the PC 10 (or a type of OS controlling the PC 10). Therefore, when the PC 10 (or the OS controlling the PC 10) determines that the PC 10 cannot supply the digital camera 1 the power amount requested by the digital camera 1, the PC 10 (or the OS controlling the PC 10) outputs the suspend signal to the digital camera 1 without requesting the digital camera 1 to perform the configuration setting, and the suspend signal is output to the digital camera 1.

Further, when the configuration setting of the digital camera 1 is completed (steps S48 to S49 in FIG. 3), the PC 10 communicates with the digital camera 1 on the communication class set by the digital camera 1. During the communication, the PC 10 may enter the power save mode or the like and output the suspend signal to the digital camera 1. In other words, the suspend detector 7b may detect the suspend signal when the USB connection state is the "configuration setting completed state" (S4). In that case, the state manager 7a sets the USB connection state to "suspend state" (S5). In the "suspend state" (S5), the digital camera 1 waits for the suspend state of the PC 10 due to the power save mode or the like to be disabled. When the suspend detector 7b detects that the suspend signal stops (i.e., the suspend state of the PC 10 is disabled), the state manager 7a returns the USB connection state to the "configuration setting completed state" (S4).

Further, when the bus reset start/detecting unit 7d performs (or detects) the USB bus reset while the USB connection state is the "address setting completed state" (S3) or the "configuration setting completed state" (S4), the state manager 7a sets the USB connection state to the "connected state" (S2).

Further, when the VBUS detector 7e detects that the 5V voltage supply to the VBUS stops while the USB connection state is set to any of the states shown in FIG. 4 (S1 to S5), the state manager 7a sets the USB connection state to the "USB cable disconnected state" (S1). Although FIG. 4 shows only an arrow indicating the transition from the state S2 to the state S1, the transition from any of the other states (S3 to S5) to the state S1 is also possible.

2-3. As to Operation Relating to USB Connection

Figure 5:
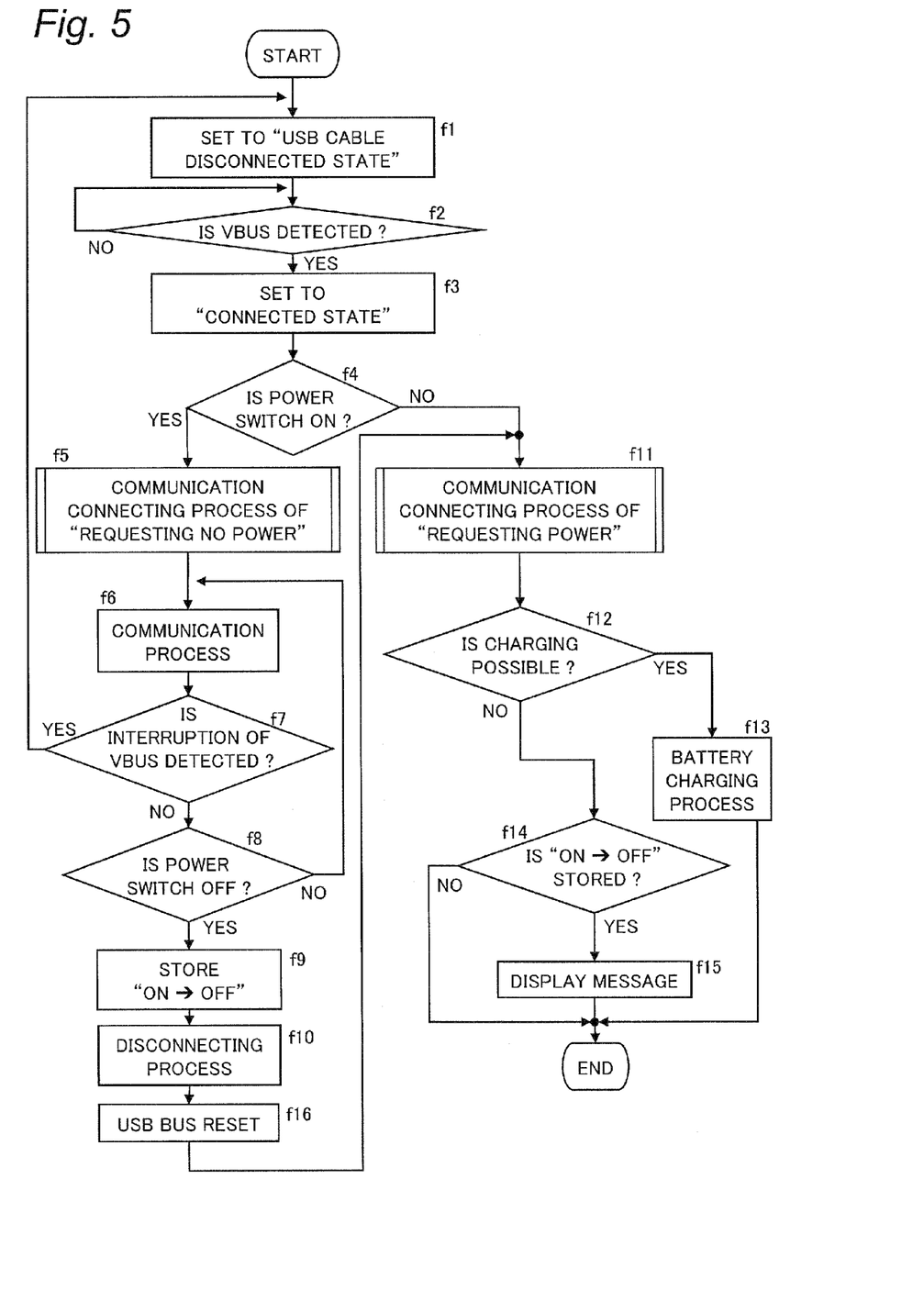
FIG. 5 is a flowchart for describing a series of operations of the digital camera relating to communication between the digital camera and the personal computer according to an exemplary embodiment.

A series of the operations of the digital camera 1 relating to the communication between the digital camera 1 and the PC 10 according to the present embodiment will be described with reference to FIG. 5.

When the digital camera 1 and the PC 10 are connected via the USB cable 9 while the power of the digital camera 1 is OFF, a circuit relating to charging the digital camera 1 is activated. Also when the digital camera 1 is turned ON, the circuit relating to the charging is activated even as the respective units of the digital camera 1 are activated.

Regardless of the power ON/OFF of the digital camera 1 (or ON/OFF of the power switch 15a), when the circuit relating to the charging in the digital camera 1 is activated, the state manager 7a sets the USB connection state to the "USB cable disconnected state" (S1) (f1). Next, the VBUS detector 7e detects the VBUS to determine whether the PC 10 is connected to the digital camera 1 via the USB cable 9 (f2). When the PC 10 is not connected to the digital camera 1 via the USB cable 9 (NO at step f2), the digital camera 1 waits until the PC 10 is connected via the USB cable 9 and the VBUS is detected. When the PC 10 is connected to the digital camera 1 via the USB cable 9 (YES at step f2), the state manager 7a changes the USB connection state into the "connected state" (S2) (f3).

Then, the USB controller 7 determines whether the power switch 15a is on the ON side (f4). When the power switch 15a is on the ON side (namely, the power is ON) (YES at step f4), the USB controller 7 executes a communication connecting process (f5) with the configuration descriptor B (including information requesting no power), to execute the communication process regarding the PC 10 (f6). Details of the communication connecting process (f5) with the configuration descriptor B will be described later.

After the establishment of the communication, during the communication process (f6), the VBUS detector 7e determines whether the VBUS is not detected (namely, the interruption of the VBUS is detected) (f7). When the VBUS detector 7e becomes does not detect the VBUS (the interruption of the VBUS is detected) (YES at step f7), the state manager 7a determines that the PC 10 connected via the USB cable 9 is disconnected, and changes the USB connection state into the "USB cable disconnected state" (S1). Then, the state manager 7a waits until the VBUS is again detected (f2).

On the other hand, while the VBUS detector 7e is detecting VBUS, the state manager 7a checks whether the power switch 15a is switched into the OFF side (namely, whether the power is turned OFF) (f8).

When the power switch 15a is on the ON side (the power ON) (NO at step f8), the USB controller 7 continues the communication process with the PC 10.

On the other hand, when the power switch 15*a* is switched to the OFF side (the power OFF) (YES at step f8), the USB controller 7 stores information indicating that the power switch 15*a* is switched from the ON side (the power ON) to the OFF side (the power OFF) (f9) during the communication, and then executes a process for disconnecting the current communication (f10). Then, the digital camera 1 generates the USB bus reset on the bus reset generator/detector 7*d* (f16), and then executes the communication connecting process in which the power supply is requested from the PC 10 (f11).

Further, at step f4, when the power switch 15*a* is on the OFF side (the power off) while the USB connection state is the "connected state" (S2) (namely, when the digital camera 1 and the PC 10 are connected to each other via the USB cable 9 while the power of the digital camera 1 is in the OFF state) (NO at step f4), the USB controller 7 executes the communication connecting process in which the power supply is requested from the PC 10 (f11). Specifically, in the communication connecting process (f11), the digital camera 1 executes the enumeration using the configuration descriptor A (including information requesting power). However, when the PC 10 does not support the power supply to the digital camera 1, the digital camera 1 executes the enumeration using the configuration descriptor B (including information requesting no power). Note that details of this process (f11) will be described later.

After the communication connecting process (f11) is executed by using the configuration descriptor A or the configuration descriptor B, the charging determiner 7*g* determines whether the battery 13 can be charged with the power supplied from the PC 10 (f12). The charging/discharging is determined in such a manner that the charging determiner 7*g* determines whether the communication is actually established by the communication setting which includes the setting of requesting the power.

Specifically, the charging determiner 7*g* determines whether the digital camera 1 is connected to the PC 10 in the communication setting which includes the setting of requesting the power. When the charging determiner 7*g* determines that the communication between the digital camera 1 and the PC 10 via the USB cable 9 is established in the communication setting which includes the setting of requesting the power, the charging determiner 7*g* determines that the charging is possible (YES at step f12). In this case, the charging determiner 7*g* controls the power controller 12 to charge the battery 13 (f13).

On the other hand, when the charging determiner 7*g* determines that the communication between the digital camera 1 and the PC 10 via the USB cable 9 is not established in the communication setting which includes the setting of requesting power (namely, the communication is established in the communication setting which includes the setting of requesting no power), the charging determiner 7*g* determines that the charging is impossible (NO at step f12). In this case, since the charging process cannot be executed on the battery 13, the process associated with turning-off of the digital camera 1 is executed.

At this time, the digital camera 1 checks whether the power switch 15*a* is switched from the ON side to the OFF side during the communication when the power switch 15*a* is on the ON side and the digital camera 1 and the PC 10 are connected via the USB cable 9 (YES at f4) (f14). Specifically, to do this check, the digital camera 1 determines whether the information indicating that the power switch 15*a* is switched from the ON side into the OFF side during the communication is stored by the USB controller 7 (f9).

When the digital camera 1 determines that the power switch 15*a* is switched from the ON side into the OFF side during the communication (YES at step f14), the digital camera 1 causes the liquid crystal monitor 5 to display the information indicating that the battery 13 cannot be charged by the PC 10 currently connected to the digital camera 1 (f15). For example, the liquid crystal monitor 5 displays a message of "charge is impossible". Then, the digital camera 1 ends the communication with the PC 10.

On the other hand, when the digital camera 1 determines that the power switch 15*a* is not switched from the ON side to the OFF side during the communication (NO at step f14), the digital camera 1 ends the communication with the PC 10 without displaying the information indicating that the battery 13 cannot be charged by the PC 10 currently connected to the digital camera 1 on the liquid crystal monitor 5. Herein, as to the state that the power switch 15*a* is not switched from the ON side into the OFF side during the communication (NO at step f14), it means that the PC 10 is connected to the digital camera 1 via the USB cable 9 while the power switch 15*a* is on the OFF side (NO at step f4).

2-4. Communication Connecting Process when Power Switch on ON Side

Figure 6:
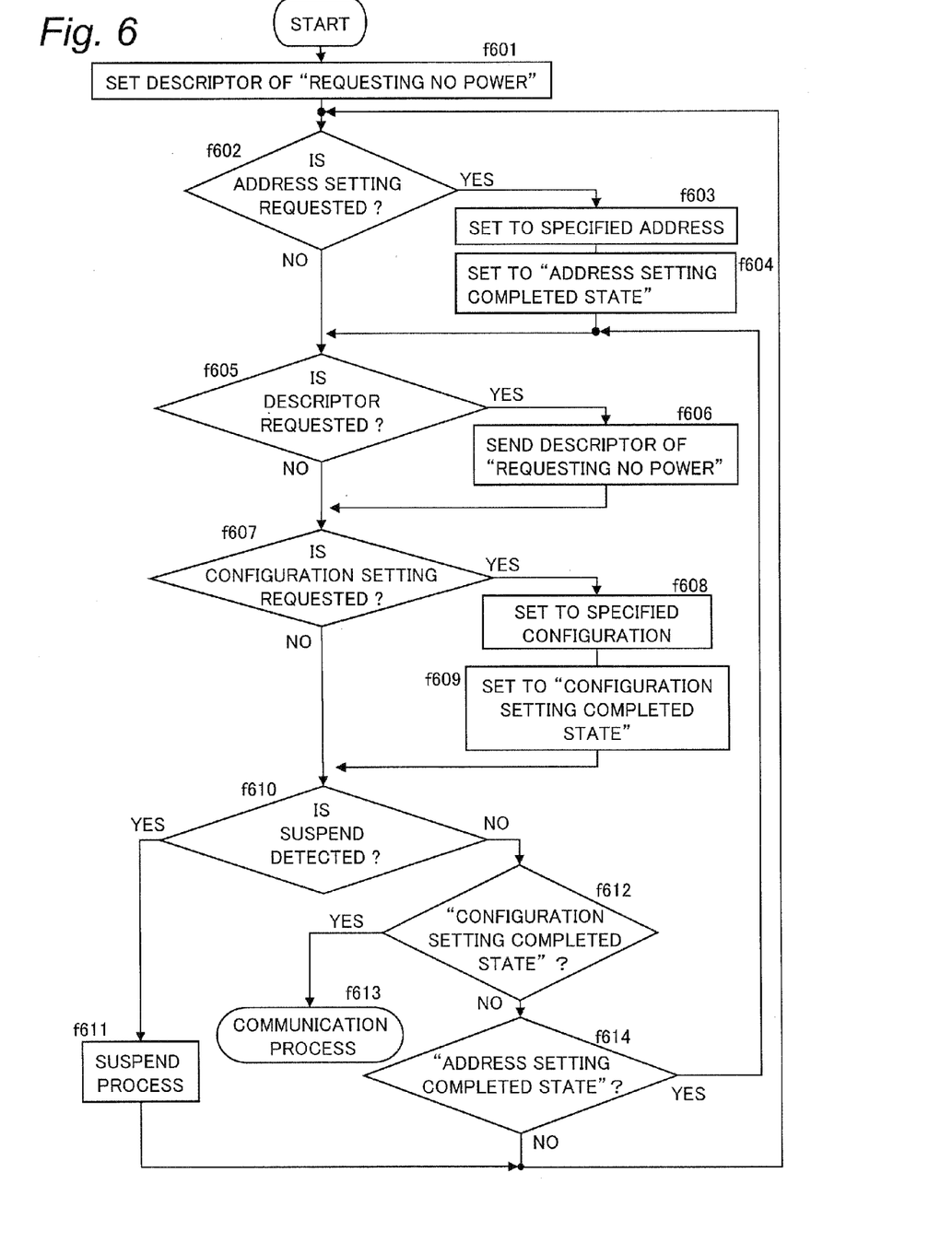
FIG. 6 is a flowchart for describing a series of operations of the digital camera according to the exemplary embodiment in a case where the digital camera does not request power from the personal computer.

Details of the communication connecting process (f5) with the configuration descriptor B (including information requesting no power) will be described with reference to FIG. 6. This process is, as described above, executed by the digital camera 1 when the PC 10 is connected to the digital camera 1 by the USB cable 9 while the power switch 15*a* is on the ON side (the power is ON) (YES at step f4).

To begin with, the descriptor switching unit 7*c* sets the configuration descriptor B (requesting no power) as the configuration descriptor to be transmitted in response to the request for the configuration descriptor from the PC 10 (f601). The descriptor switching unit 7*c* sets the device descriptor accordingly.

Next, the USB controller 7 determines whether the request from the PC 10 is a request for an address setting (f602). When the request from the PC 10 is the request for the address setting (YES at step f602), the USB controller 7 sets the address of the digital camera 1 to the address specified by the PC 10 (f603). Then, the state manager 7*a* sets the USB connection state to the "address setting completed state" (S3) (f604).

After the USB connection state is set to the "address setting completed state" (S3) (f604), or when the request from the PC 10 is not the request for the address setting (NO at step f602), the USB controller 7 determines whether the request from the PC 10 is the request for the descriptor (f605). Specifically, the USB controller 7 determines whether the request from the PC 10 is the request for the device descriptor or the configuration descriptor.

When the request from the PC 10 is the request for the device descriptor or the configuration descriptor (YES at step f605), the USB controller 7 transmits a descriptor of type which is requested by the PC 10 to the PC 10 (f606). The descriptor to be transmitted at this time is a preset descriptor (f601).

After the USB controller 7 transmits the descriptor to the PC 10 (f606), or when the request from the PC 10 is not the request for the descriptor (NO at step f605), the USB controller 7 determines whether the request from the PC 10 is the request for a configuration setting (f607).

When the request from the PC 10 is the request for the configuration setting (YES at step f607), the USB controller 7 sets the configuration (communication setting) of the digital camera 1 to the configuration specified by the PC 10 (f608).

Then, the state manager 7a changes the USB connection state into the "configuration setting completed state" (S4) (f609).

After the USB connection state is changed into the "configuration setting completed state" (S4) (f609), or when the request from the PC 10 is not the request for the configuration setting (NO at step f607), the USB controller 7 determines whether the suspend detector 7b detects the suspend signal (f610).

When the suspend detector 7b detects the suspend signal (YES at step f610), the state manager 7a changes the USB connection state into the "suspend state" (S5). Then, based on the fact that the USB connection state is changed to the "suspend state" (S5), the digital camera 1 determines that the PC 10 enters the power-saving mode and executes a suspend process to wait for release of the PC 10 from the power-saving mode (f611). The suspend process ends when the suspend detector 7b does not detect the suspend signal. After the suspend process, the USB controller 7 again determines whether the request from the PC 10 is the request for the address setting (f602).

On the other hand, when the suspend detector 7b does not detect the suspend signal (NO at step f610), the USB controller 7 determines whether the current USB connection state is the "configuration setting completed state" (S4) (f612).

When the configuration is already set (YES at step f612), the communication is estimated to be already established. Hence, the digital camera 1 communicates with the PC 10 with the communication class set during the configuration setting (f213).

On the other hand, when the USB connection state is not the "configuration setting completed state" (S4) (NO at step f612), the USB controller 7 determines whether the USB connection state is the "address setting completed state" (S3) (f614).

When the address setting has not yet been requested by the PC 10 (NO at step f614), the USB controller 7 again determines whether the PC 10 requests the address setting (f602).

On the other hand, when the address setting (YES at step f614) has already requested, the USB controller 7 returns to the determination of the descriptor request (f605).

With the above operation, when the suspend signal is not detected in the suspend detecting process (f610), the digital camera 1 can proceed to the process based on the USB connection state.

2-5. Communication Connecting Process when Power Switch is on OFF Side>

Figure 7:
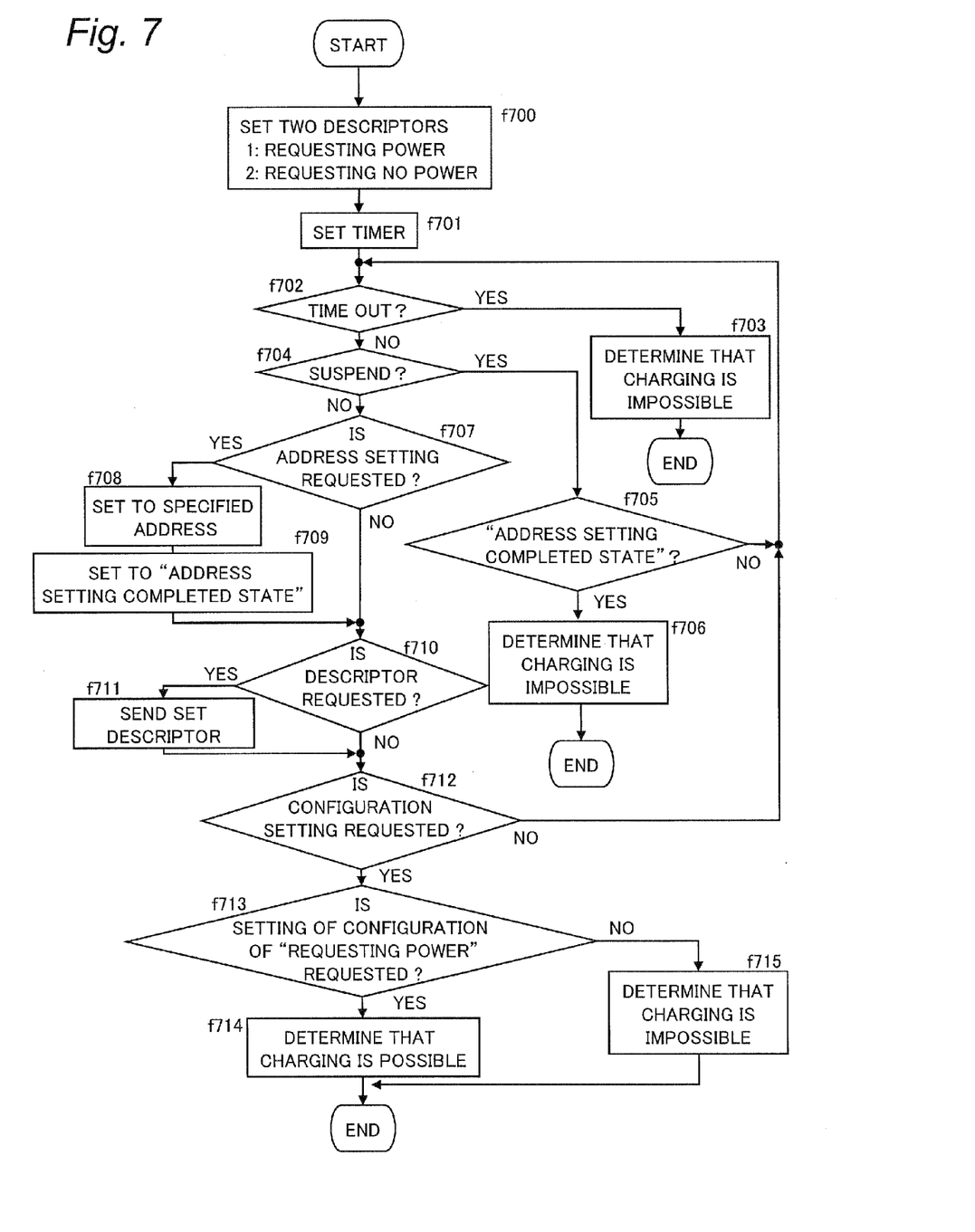
FIG. 7 is a flowchart for describing a series of operations of the digital camera according to the exemplary embodiment in a case where the digital camera requests power from the personal computer.

Details of the communication connecting process (f11) for requesting the PC 10 to supply the power will be described with reference to FIG. 7. This process is, as described above, executed by the digital camera 1 when the power switch 15a is switched from the ON side to the OFF side (YES at step f8) during the communication process (f6) between the digital camera 1 and the PC 10. Alternatively, this process is executed when the PC 10 is connected to the digital camera 1 via the USB cable 9 while the power switch 15a is on the OFF side (NO at step f4).

To begin with, in order to execute the communication connecting process in which the power supply is requested from the PC 10, the descriptor switching unit 7c sets two configuration descriptors as the configuration descriptors to be transmitted in the response to the descriptor request from the PC 10. Specifically, as the first configuration descriptor, the descriptor A (including the information requesting the power) is set, and as the second configuration descriptor, the descriptor B (including the information requesting no power) is set (f700). Then the device descriptor is set so that the configuration descriptors A and B are transmitted to the PC 10 in the response.

The two configuration descriptors are set and transmitted at step f700 for the following reason. Generally, in the USB connection, a USB device (in the present exemplary embodiment, the digital camera 1) transmits the configuration descriptor including the setting of the power request (information indicating a current value, any one of bus power driving and self-power driving, and the like) to the PC 10 in response to the request for the configuration descriptor from the PC 10.

At this time, the USB device can retain a plurality of configuration descriptors. The number of configuration descriptors retained by the USB device is indicated by the device descriptor to be transmitted to the PC 10 in response to the request for the device descriptor from the PC 10.

The PC 10 can grasp the number of configurations supported by the USB device based on the device descriptor received from the USB device. Then, the PC 10 requests individual configuration descriptors from the USB devices based on the received device descriptor. Thereby, the PC 10 can receive the individual configuration descriptors on the USB device side from the USB devices.

The PC 10 determines whether PC 10 supports the communication setting (configuration) indicating by the respective received configuration descriptors (namely, whether the PC 10 can select the configuration descriptors).

When the received configuration descriptors include a configuration descriptor selectable by the PC 10, the PC 10 requests the USB device to set the configuration indicated by the selectable configuration descriptor (the request for the configuration setting). When the digital camera 1 sets the configuration, the enumeration is completed.

On the other hand, when the received configuration descriptors include no selectable configuration descriptor, as described above, the PC 10 transmits the suspend signal to the digital camera 1.

In the present embodiment, the descriptor switching unit 7c sets the two configuration descriptors (configuration descriptors A and B) as the configuration descriptors to be transmitted to the PC 10. This is because it is not clear whether the PC 10 connected via the USB cable 9 can supply the power to the digital camera 1. That is to say, the two configuration descriptors are set so that, in both cases where the PC 10 can supply the power to the digital camera 1 and cannot supply the power, the communication between the PC 10 and the digital camera 1 is established.

The above is the reason for setting the two configuration descriptors at step f700.

A sequel to this process (f11) will be described returning to FIG. 7. When a descriptor to be transmitted to the PC 10 is set (f700), the USB controller 7 sets a timer at a time of starting the communication with the PC 10 (f701). This is because of the following reason. As described above, when the PC 10 requests the configuration descriptor from the digital camera 1, the digital camera 1 transmits a preset configuration descriptor to the PC 10. However, when the configuration descriptors received by the PC 10 include no configuration descriptor selectable by the PC 10, the digital camera 1 is not requested the configuration setting, and thus the communication stops. Therefore, the digital camera 1 sets a timeout period (for a constant period), in order to suspend the process for establishing the communication when the digital camera 1 is not requested by the PC 10 for the configuration setting for the constant time.

After the timer setting (f701), the USB controller 7 checks whether the communication between the PC 10 and the digital camera 1 times out (f702). When the communication times out (YES at step f702), the USB controller 7 has not been requested the configuration setting within a predetermined time, and thus the USB controller 7 determines that the PC 10 connected via the USB cable 9 is incapable of supplying the power (namely, the battery 13 cannot be charged) (f703). Then, the USB controller 7 end the process relating to the establishment of the communication with the PC 10.

On the other hand, when the communication with the PC 10 does not time out (NO at step f702), the USB controller 7 determines whether the suspend detector 7b detects the suspend signal (f704).

The reason that the USB controller 7 determines the output of the suspend signal from the PC 10 at this time will be described. When the PC does not have an ability to supply the power with respect to the configuration descriptor including the information requesting the power transmitted from the USB device to the PC, the PC (or an OS for controlling the PC) assumed in the present embodiment is configured to output the suspend signal without requesting the USB device to perform the configuration setting. Therefore, in order to detect the suspend signal that might be output after the transmission of the configuration descriptor from the digital camera 1, the USB controller 7 determines presence/absence of the suspend signal. Note that the suspend signal to be determined at this time by the USB controller 7 includes a suspend signal to be output when the PC 10 is in the initial suspend state, and a suspend signal to be output when the PC 10 is in the power-saving mode.

When determining that the suspend detector 7b detects the suspend signal (YES at step f704), the USB controller 7 checks whether the USB connection state is the "address setting completed state" (S3) (f705). Herein, the "address setting completed state" is a state in which the digital camera 1 has already been requested the address setting by the PC 10, as described above.

When the USB connection state is the "address setting completed state" (S3) (YES at step f705), the USB controller 7 determines that the PC 10 is incapable of charging (namely, the battery 13 cannot be charged) (f706), and then ends the process relating to the establishment of the communication with the PC 10. Such a determination is performed because it is assumed in this embodiment that the suspend signal is output when the PC 10 determines that the PC 10 cannot communicate with the digital camera 1 with the communication setting indicated by the configuration descriptor A transmitted from the digital camera 1.

Note that there are some PCs (or some OS for controlling the PCs) that, when determining that the PC does not support the configuration descriptor which is set first, do not determine the second and thereafter configuration descriptors and transmit the suspend signal to the digital camera 1. Even when connected to such a kind of PC 10, the digital camera 1 according to the present embodiment can treat the PC by the steps of this process (steps f705 to f706).

On the other hand, when the USB connection state is not the "address setting completed state" (S3) (NO at step f705), the USB controller 7 checks again whether the communication between the PC 10 and the digital camera 1 times out (f702). When the suspend signal is detected and the USB connection state is not the "address setting completed state" (S3), it can be estimated that the PC 10 outputs the suspend signal in the initial suspend state. Therefore, the USB controller 7 repeats the operations (steps f702 to f705) including the determination of timeout through the determination whether the USB connection state is the "address setting completed state" (S3) until the initial suspend state of the PC 10 is released. Then, when the initial suspend state of the PC 10 is released (NO at step f704), the USB controller 7 proceeds to the next operation.

When the suspend signal is not detected at the suspend determination (f704) (NO at step f704), the USB controller 7 checks whether the request from the PC 10 is the address setting request (f707).

When the request from the PC 10 is the address setting (YES at step f707), the USB controller 7 sets the address of the digital camera 1 to the address specified by the PC 10 (step f708). Then, the state manager 7a sets the USB connection state to the "address setting completed state" (S3) (f709).

After the USB connection state is set to the "address setting completed state" (S3) (f709), or when the request from the PC 10 is not the address setting request (NO at step f707), the USB controller 7 determines whether the request from the PC 10 is a descriptor request (f710).

When the request from the PC 10 is the descriptor request (YES at step f710), the USB controller 7 transmits a currently set descriptor (f700) to the PC 10 (f711).

After the descriptor is transmitted to the PC 10 (f711), or when the request from the PC 10 is not the descriptor request (NO at step f710), the USB controller 7 determines whether the request from the PC 10 is the configuration setting request (f712).

When the request from the PC 10 is not the configuration setting request (NO at step f712), the USB controller 7 checks again whether the communication between the PC 10 and the digital camera 1 times out (f702). Then, the USB controller 7 again performs the suspend determination (f704) and the determination of the request from the PC 10 (f707, f710 and f712).

On the other hand, when the request from the PC 10 is the configuration setting request (YES at step f712), the USB controller 7 determines whether the configuration setting requested by the PC 10 is the configuration setting which includes the setting of requesting the power or the configuration setting which includes the setting of requesting no power (f713).

When the configuration setting requested by the PC 10 is the configuration setting which includes the setting of requesting the power (YES at step f713), the USB controller 7 determines that the PC 10 is capable of supplying the power, namely, "the charging is possible" (f714). Then, the USB controller 7 ends the process relating to the establishment of the communication with the PC 10.

On the other hand, when the configuration setting requested by the PC 10 is not the configuration setting which includes the setting of requesting the power, namely, the configuration setting requested by the PC 10 is the configuration setting that includes the setting of requesting no power (NO at step f713), the USB controller 7 determines that the PC 10 is incapable of supplying the power, namely, "the charging is impossible" (f715). Then, the USB controller 7 ends the process relating to the establishment of the communication with the PC 10.

As described above, the USB device (the digital camera 1) executes the process described with reference to the flowcharts in FIG. 5 through FIG. 7 in the establishment of the communication with the PC 10. Specifically, when the digital camera 1 of the power which is ON is connected to the PC 10 via the USB cable 9, the digital camera 1 sets the configuration descriptor B (including the information requesting no power) to be transmitted. Then, the digital camera 1 transmits the configuration descriptor B to the PC 10 in response to the request for the configuration descriptor from the PC 10. As a result, the communication is more likely to be established at a higher speed in comparison with the case where the digital camera 1 transmits the descriptor including the information requesting the power to the PC 10 incapable of supplying the power.

Further, when the power switch 15*a* is switched into the OFF side while the digital camera 1 is connected to the PC 10, the digital camera 1 sets both the configuration descriptor A (including the information requesting the power) and the configuration descriptor B (including the information requesting no power) to be transmitted, and then tries to connect to the PC 10 again (the enumeration is carried out again). Then, the digital camera 1 determines whether the PC 10 it is connected to while the power switch 15*a* is switched to the OFF side is capable of supplying the power. As a result, when the connected PC 10 cannot supply the power, the digital camera 1 can notify a user that the PC 10 cannot supply the power by displaying information (for example, a message) representing that the PC 10 cannot supply the power on the liquid crystal monitor 5. On the other hand, when the connected PC 10 can supply the power, the digital camera 1 can start the charging process immediately after the power switch 15*a* is switched into the OFF side. The digital camera 1 according to the present embodiment produces the above effects.

In the present embodiment, in the communication connecting process (f11) in which the power supply is requested, both the configuration descriptor A (the information requesting the power) and the configuration descriptor B (including the information requesting no power) are transmitted to the PC 10. However, only the configuration descriptor A may be transmitted. This case also yields the effect similar to the above effect.

3. Conclusion of Present Embodiment

The digital camera 1 according to the present embodiment can communicate with the PC 10 via the USB interface. The digital camera 1 has the power switch 15*a* operable to receive the operation for switching on and off the power of the digital camera 1, the power switch 15*a* being turned off when receiving the operation for switching off and turned on when receiving the operation for switching on, the VBUS detector 7*e* operable to detect the connection between the digital camera 1 and the PC 10 via the USB interface, and the requestor operable to request the PC 10 to supply the power. When the VBUS detector 7*e* detects the connection between the digital camera 1 and the PC 10 with the power switch 15*a* being ON, the USB controller 7 does not request the PC 10 to supply the power in the enumeration for establishing the communication with the PC 10. When the VBUS detector 7*e* detects the connection between the digital camera 1 and the PC 10 and the power switch 15*a* is switched from ON to OFF, the USB controller 7 requests the PC 10 to supply the power in the enumeration.

When the power switch 15*a* is ON, the digital camera 1 having the above configuration does not request the PC 10 to supply the power. For this reason, the communication with the PC 10 is more likely to be established at a higher speed than the case in which the PC 10 is requested for the power supply. Also, the digital camera 1 requests the PC 10 to supply the power at the non-operation time of the digital camera 1 at which the establishment of the high-speed communication is not expected.

Therefore, the digital camera 1 can satisfy the high-speed establishment of the communication at the operation time of the digital camera 1 and the request to the PC 10 for the power supply. As a result, convenience can be improved when the digital camera 1 that can request the PC 10 to supply the power is connected with the PC 10.

4. Other Embodiments

The idea of the above embodiment is not limited by the above embodiment. Other embodiments to which the idea of the above embodiment can be applied will be described below.

The digital camera 1 according to the above embodiment requests the PC 10 to supply the power for charging. However, the power which the PC 10 is requested to supply may be a power for use applications other than charging. The idea of the above embodiment can be applied also to the digital camera 1 that requests the PC 10 to supply the power for driving the digital camera 1, for example.

Further, the digital camera 1 according to the above embodiment is connected to the PC 10 via the USB interface. However, the idea of the above embodiment can be applied also to the digital camera connected to the PC 10 via an interface other than the USB interface. In this case, the digital camera transmits information indicating presence/absence of the request for the power supply to the PC 10 in the process for establishing the communication with the PC 10.

Further, when the digital camera 1 according to the above embodiment determines that the battery 13 cannot be charged (NO at step f12), the digital camera 1 displays information representing that the battery 13 cannot be charged only when the power switch 15*a* is switched from ON into OFF in the communication with the PC 10 (YES at step f14). However, the information representing that the battery 13 cannot be charged may be displayed also when the power switch 15*a* is not switched from ON into OFF (NO at step f14) in the communication with the PC 10.

Further, in the above embodiment, the communication connecting process (f5) in which the power supply is requested from the PC 10 is executed when the power switch 15*a* is on the ON side and the digital camera 1 is connected to the PC 10 via the USB cable 9. However, also in the case where the digital camera 1 is already connected to the PC 10 via the USB cable 9 with the power switch 15*a* being on the OFF side, the communication connecting process (f5) in which the power supply is requested from the PC 10 may be executed when the power switch 15*a* is switched from OFF into ON.

In the above embodiment, the digital camera is illustrated as one example of the electronic device. The idea of the above embodiment, however, can be applied also to electronic devices other than the digital camera that can request the power supply from the host device. The idea of the above embodiment can be applied to any electronic devices (video cameras, mobile telephones, smartphones, mobile game devices, and so on) that can USB-connect as a function.

The embodiments have been described above as examples of the art of the present disclosure. For this purpose, the detailed description and the attached drawings have been disclosed. Therefore, some of the elements described in the detailed description and shown in the attached drawings may be unnecessary to solve the problem. Therefore, the unnecessary element should not be instantly recognized as a necessary element merely because being described in the detailed description and shown in the attached drawings.

The above described embodiments exemplify the art of the present disclosure. Therefore, The above described embodiments can be subject to various changes, substitutions, addition, omission and/or the like without departing from the scope of the claims and the their equivalent.

INDUSTRIAL APPLICABILITY

Since the disclosed art can improve usability relating to the charging operation of the electronic device, the disclosed art can be applied to a digital camera, a video camera, a mobile telephone, a smartphone, a mobile game device, and so on.

What is claimed is:

1. An electronic device capable of communicating with an external device according to a predetermined method, comprising:
    a power switch operable to receive an operation for switching on and off the electronic device, the power switch being turned off when receiving the operation for switching off and turned on when receiving the operation for switching on;
    a detector operable to detect a connection between the electronic device and the external device according to the predetermined method; and
    a requestor operable to request the external device to supply power, wherein
    when the detector detects the connection between the electronic device and the external device with the power switch being ON, the requestor does not request the external device to supply the power during an establishing process for establishing the communication with the external device,
    when the detector detects the connection between the electronic device and the external device and the power switch is switched from ON to OFF, the requestor requests the external device to supply the power during the establishing process,
    the establishing process for establishing the communication with the external device is via a USB enumeration, and
    when the detector detects the connection between the electronic device and the external device and the power switch is switched from ON to OFF, the requestor requests the external device to supply the power during the USB enumeration by a transmission of a predetermined configuration descriptor which includes information requesting power.

2. The electronic device according to claim 1, wherein the requestor requests the external device an amount of supply which enables the charging of a battery which supplies power to respective units of the electronic device.

3. The electronic device according to claim 2, further comprising a charger operable to charge the battery with the power supplied from the external device when the requestor requests the external device to supply the power during the establishing process and the communication between the electronic device and the external device is established.

4. The electronic device according to claim 2, further comprising a display unit operable to display information representing that the battery cannot be charged when the requestor requests the external device to supply the power in the establishing process and the communication between the electronic device and the external device is not established.

5. The electronic device according to claim 1, wherein the predetermined method is USB standard.

6. The electronic device according to claim 1, wherein the predetermined configuration descriptor includes information indicating a value of power to be requested from the external device and information indicating a communication class supported by the electronic device.

7. An electronic device capable of communicating with an external device according to a predetermined method, comprising:
    a controller; and
    a memory storing instructions for configuring the controller, the controller configured to:
    detect a connection between the electronic device and the external device; and
    when the connection between the electronic device and the external device is detected, send a request for requesting the external device to supply power during an establishing process for establishing the communication with the external device only when power to the electronic device is in an off state, wherein:
    the establishing process for establishing the communication with the external device is via a USB enumeration; and
    when the connection between the electronic device and the external device is detected, the request to the external device is sent for supplying the power during the USB enumeration by a transmission of a predetermined configuration descriptor which includes information requesting power.

8. The electronic device according to claim 7, wherein the predetermined configuration descriptor includes information indicating a value of power to be requested from the external device and information indicating a communication class supported by the electronic device.

* * * * *